US010910817B2

(12) United States Patent
Horinouchi et al.

(10) Patent No.: US 10,910,817 B2
(45) Date of Patent: Feb. 2, 2021

(54) DC CIRCUIT BREAKER

(71) Applicant: Mitsubishi Electric Corporation, Chiyoda-ku (JP)

(72) Inventors: Katsuhiko Horinouchi, Chiyoda-ku (JP); Motohiro Sato, Chiyoda-ku (JP); Kazuki Takahashi, Chiyoda-ku (JP); Ryo Kamimae, Chiyoda-ku (JP); Sho Tokoyoda, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 717 days.

(21) Appl. No.: 15/513,858

(22) PCT Filed: Jun. 5, 2015

(86) PCT No.: PCT/JP2015/066291
§ 371 (c)(1),
(2) Date: Mar. 23, 2017

(87) PCT Pub. No.: WO2016/047209
PCT Pub. Date: Mar. 31, 2016

(65) Prior Publication Data
US 2017/0288388 A1 Oct. 5, 2017

(30) Foreign Application Priority Data
Sep. 26, 2014 (JP) ................................ 2014-196670

(51) Int. Cl.
*H02H 3/087* (2006.01)
*H01H 9/54* (2006.01)
(Continued)

(52) U.S. Cl.
CPC .............. *H02H 3/087* (2013.01); *H01H 9/54* (2013.01); *H01H 33/59* (2013.01);
(Continued)

(58) Field of Classification Search
CPC ...... H02H 3/087; H01H 33/596; H01H 33/59; H01H 9/54; H01H 77/02; H01H 33/6661
See application file for complete search history.

(56) References Cited

U.S. PATENT DOCUMENTS 3,868,550 A * 2/1975 Knauer ................ H01H 33/596
361/4
4,740,858 A * 4/1988 Yamaguchi .......... H01H 33/596
361/3
(Continued)

FOREIGN PATENT DOCUMENTS

CN 102687221 A 9/2012
CN 103762547 A * 4/2014 ............. H02H 3/087
(Continued)

OTHER PUBLICATIONS

International Search Report dated Aug. 25, 2015, in PCT/JP2015/066291, filed Jun. 5, 2015.
(Continued)

*Primary Examiner* — Pinping Sun
(74) *Attorney, Agent, or Firm* — Xsensus LLP

(57) ABSTRACT

A DC circuit breaker includes: a mechanical switch provided on an electrical path through which a direct current flows; and a semiconductor switch connected in parallel with the mechanical switch. The mechanical switch includes a gas disconnector and a vacuum circuit breaker connected in series. Normally, the direct current flows through the mechanical switch. When interrupting the direct current, the vacuum circuit breaker is made nonconductive to allow the direct current to be commutated to the semiconductor switch, and subsequently the gas disconnector and the semiconductor switch are made nonconductive. A vacuum circuit breaker having a low withstand voltage can be used.

11 Claims, 10 Drawing Sheets

(51) Int. Cl.
*H01H 33/59* (2006.01)
*H01H 77/02* (2006.01)
*H01H 33/666* (2006.01)

(52) U.S. Cl.
CPC .......... *H01H 33/596* (2013.01); *H01H 77/02* (2013.01); *H01H 33/6661* (2013.01)

(56) References Cited

U.S. PATENT DOCUMENTS

| | | | | |
|---|---|---|---|---|
| 5,452,170 | A * | 9/1995 | Ohde | H01H 33/596 |
| | | | | 174/17 |
| 8,742,828 | B2 | 6/2014 | Naumann et al. | |
| 8,891,209 | B2 * | 11/2014 | Hafner | H01H 9/541 |
| | | | | 361/13 |
| 9,178,348 | B2 * | 11/2015 | Gaxiola | H01H 33/596 |
| 9,680,464 | B2 * | 6/2017 | Iwabuki | H01H 9/541 |
| 2012/0007657 | A1 | 1/2012 | Naumann et al. | |
| 2012/0299393 | A1* | 11/2012 | Hafner | H01H 9/542 |
| | | | | 307/113 |
| 2014/0226247 | A1* | 8/2014 | Gaxiola | H02H 3/087 |
| | | | | 361/100 |
| 2015/0022928 | A1* | 1/2015 | Mohaddes Khorassani | |
| | | | | H02H 1/0007 |
| | | | | 361/93.7 |
| 2015/0043120 | A1* | 2/2015 | Tahata | H02H 3/087 |
| | | | | 361/93.9 |
| 2016/0285250 | A1* | 9/2016 | Lee | H01H 9/54 |
| 2016/0322178 | A1* | 11/2016 | Park | H01H 9/30 |
| 2016/0329179 | A1* | 11/2016 | Kim | H01H 33/596 |

FOREIGN PATENT DOCUMENTS

| | | | | |
|---|---|---|---|---|
| DE | 196 19 437 A1 | 11/1997 | | |
| DE | 102012217280 A1 * | 3/2014 | | H01H 9/541 |
| JP | 54-132776 A | 10/1979 | | |
| JP | 54-149873 A | 11/1979 | | |
| JP | 55-126923 A | 10/1980 | | |
| JP | 58-34525 A | 3/1983 | | |
| JP | 62-7738 U | 1/1987 | | |
| JP | 5-14690 Y2 | 4/1993 | | |
| JP | 7-161264 A | 6/1995 | | |
| JP | 10-126961 A | 5/1998 | | |
| JP | 2000-48686 A | 2/2000 | | |
| JP | 2003317582 A * | 11/2003 | | |
| JP | 2012-521620 A | 9/2012 | | |
| WO | 2011/057675 A1 | 5/2011 | | |

OTHER PUBLICATIONS

Combined Office Action and Search Report dated Apr. 4, 2018 in Chinese Patent Application No. 201580051612.6 with English translation of the Office Action and English translation of categories of cited documents, 21 pages.

Extended European Search Report dated May 16, 2018 in European Patent Application No. 15844233.5.

Office Action dated Oct. 8, 2018 in corresponding Chinese Patent Application No. 201580051612.6 (with English Translation), 18 pages.

Combined Chinese Office Action and Search Report dated Mar. 27, 2019 in Patent Application No. 201580051612.6, 26 pages (with unedited computer generated English translation of the Office Action and English Translation of Category of Cited Documents).

Zhao, M., "R&D Status and Prospects of HVDC Circuit Breakers", Smart Grid, vol. 1, No. 1, Nov. 10, 2013, pp. 12-16 (with English Abstract).

* cited by examiner

DC CIRCUIT BREAKER

TECHNICAL FIELD

The present invention relates to a DC circuit breaker device, and particularly relates to a DC circuit breaker which opens to interrupt or closes to pass a load current of a DC electric power system in normal state, and interrupts a short-circuit current or a ground-fault current upon occurrence of a fault to thereby protect load equipment.

BACKGROUND ART

An electric power system is equipped with a circuit breaker which interrupts a fault current upon occurrence of a fault. A mechanical AC circuit breaker such as gas circuit breaker, vacuum circuit breaker, and air circuit breaker commonly used in an AC electric power system cannot interrupt the current unless the current value becomes zero. Therefore, the AC circuit breaker interrupts the fault current at a timing when the current value becomes zero which occurs every half cycle of AC.

Therefore, in order for a mechanical circuit breaker to interrupt a direct current which does not have a zero point due to its nature, it is necessary to take measures to force the current value to become zero.

There is also a method of interrupting a direct current by means of a semiconductor switch. For this method, the measures to force the current value to become zero are unnecessary, and the current can be interrupted by opening the semiconductor switch. When, however, a load current is conducted through the semiconductor switch in normal conducting state, namely in closed state, Joule heat is generated due to a resistance component of the semiconductor switch and accordingly a power loss is generated. In contrast, a mechanical switch conducts current through its metal contacts, and the power loss is therefore small.

In a DC circuit breaker for example of Japanese Patent Laying-Open No. 58-34525 (PTD 1), a mechanical switch is connected in parallel with a GTO (Gate Turn-Off thyristor) which is a semiconductor switch. Normally, the mechanical switch conducts current. Upon occurrence of a fault, a fault current is commutated from the mechanical switch to the GTO and accordingly interrupted by the GTO.

In order to interrupt an extra-high-voltage direct current by semiconductor switches, a DC circuit breaker of WO2011/057675 includes: a large number of series-connected main semiconductor switches; a smaller number of series-connected auxiliary semiconductor switches relative to the number of the series-connected main semiconductor switches; and a mechanical disconnector connected in series with the auxiliary semiconductor switches and opening at high speed. Normally, the auxiliary semiconductor switches conduct current. Upon occurrence of a fault, a fault current is commutated from the auxiliary semiconductor switches to the main semiconductor switches and accordingly the fault current is interrupted by the main semiconductor switches.

CITATION LIST

Patent Document

PTD 1: Japanese Patent Laying-Open No. 58-34525
PTD 2: WO2011/057675

SUMMARY OF INVENTION

Technical Problem

In order to use the DC circuit breaker of PTD 1 for an extra-high-voltage power transmission system, it is necessary to connect a large number of GTOs in series and thereby obtain an adequate withstand voltage. In order to commutate a current from the mechanical switch to the series-connected GTOs upon occurrence of a fault, it is necessary to generate, across the mechanical switch, an arc voltage higher than a voltage (ON voltage) at which the series-connected GTOs are turned on. In the case of a vacuum contactor used as the mechanical switch of PTD 1, however, a sufficient arc voltage may not be generated across the vacuum contactor in some cases.

Moreover, in the DC circuit breaker of PTD 1, a mechanical disconnector is connected in series with the GTO. The disconnector is opened when a current flowing through a surge absorption device becomes zero. Therefore, a voltage applied across the two terminals of the surge absorption circuit, namely at least a system voltage, is applied to the mechanical switch. The mechanical switch is therefore required to allow an arc voltage to be generated across the mechanical switch and also required to have an interelectrode voltage withstanding capability in order to withstand an extra high voltage. Accordingly, there arises the need to use an expensive circuit breaker.

In the DC circuit breaker of PTD 2, a large number of semiconductor switches are connected in series to thereby solve the problem occurring to PTD 1, by use of a disconnector and an auxiliary semiconductor switch, rather than a single mechanical switch. Namely, the DC circuit breaker of PTD 2 enables commutation to the main semiconductor switches without the need to generate a zero point of the current and enables the disconnector to withstand an extra high voltage. In this way, the need for the auxiliary semiconductor switch to withstand an extra high voltage applied across the auxiliary semiconductor switch is eliminated. However, while a normal current is flowing through the auxiliary semiconductor switch, a power loss is generated from the auxiliary semiconductor switch.

A principal object of the present invention is therefore to provide a low-cost DC circuit breaker with a small power loss.

Solution to Problem

A DC circuit breaker according to the present invention includes: a mechanical switch provided on an electrical path through which a direct current flows; and a semiconductor switch connected in parallel with the mechanical switch. The mechanical switch includes a disconnector and a circuit breaker connected in series. Normally, the direct current flows through the mechanical switch. When interrupting the direct current, the mechanical switch is made nonconductive to allow the direct current to be commutated to the semiconductor switch, and subsequently the semiconductor switch is made nonconductive.

Advantageous Effects of Invention

The DC circuit breaker according to the present invention normally allows a direct current to flow through the mechanical disconnector and circuit breaker, and thus the power loss can be reduced. Moreover, as this circuit breaker, a circuit breaker having a relatively low voltage withstanding capability may be used, and thus the price of the DC circuit breaker can be reduced. Further, the disconnector can be formed with a short gap, and thus the size and the price of the DC circuit breaker can be reduced. In addition, when a direct current is to be interrupted, the direct current is commutated to the semiconductor switch where the current is interrupted. The time taken for interrupting the current can thus be shortened.

DESCRIPTION OF EMBODIMENTS

First Embodiment

Figure 1:
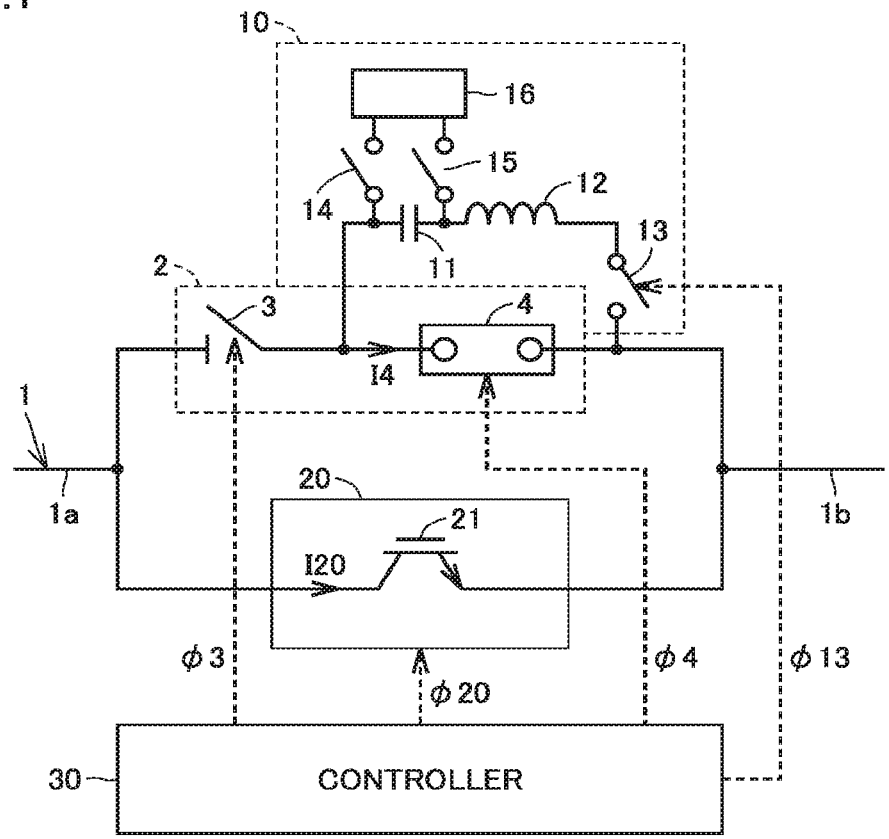
FIG. 1 is a circuit block diagram showing a configuration of a DC circuit breaker in a first embodiment of the present invention.

FIG. 1 is a circuit block diagram showing a configuration of a DC circuit breaker in a first embodiment of the present invention. In FIG. 1, this DC circuit breaker is provided on an electrical path 1 of a DC power transmission system, and includes a mechanical switch 2, a forced commutating circuit 10, a semiconductor switch 20, and a controller 30. Mechanical switch 2 includes a gas disconnector 3 and a vacuum circuit breaker 4 connected in series between an upstream electrical path 1a and a downstream electrical path 1b.

Gas disconnector 3 is controlled by control signal φ3 from controller 30. Normally, gas disconnector 3 is caused to be in closed state (conducting state) to pass a direct current. For interruption of the direct current, the direct current is commutated to semiconductor switch 20 and thereafter gas disconnector 3 is caused to be in opened state (non-conducting state).

Gas disconnector 3 includes a tank filled with insulating gas such as $SF_6$, dry air, nitrogen, argon, or carbon dioxide, two electrodes provided in the tank, and a driver causing contacts of the two electrodes to be connected to conduct the current or causing the contacts thereof to be disconnected to interrupt the current. Gas disconnector 3 has an insulation capability (voltage withstanding capability) which is a capability to withstand a voltage applied to the DC circuit breaker when the distance between the contacts becomes equal to or more than a certain distance.

The driver drives the electrodes using a high speed spring, a hydraulic pressure, an electromagnetic force, or the like. The driver which uses the electromagnetic force may be configured to supplement its driving force with an electromagnetic force generated from a large DC fault current, using an electromagnetic repulsion plate, a driving coil, or the like.

Figure 2:
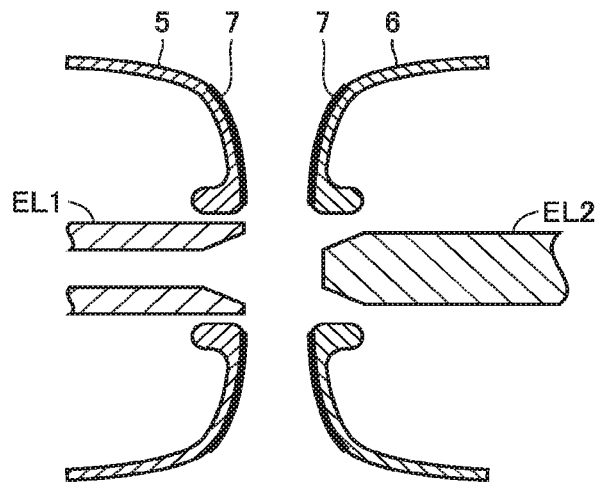
FIG. 2 is a cross-sectional view showing main components of a gas disconnector shown in FIG. 1.

FIG. 2 is a cross-sectional view showing main components of gas disconnector 3. In FIG. 2, two electrodes EL1, EL2 are provided so that respective contacts face each other in the tank (not shown) filled with the insulating gas. The contacts of electrodes EL1, EL2 are caused to be connected to each other or disconnected from each other by the driver (not shown). FIG. 2 shows the state where the contacts of electrodes EL1, EL2 are disconnected from each other.

In order for a sufficient insulation capability to be exhibited even when the distance between the contacts of electrodes EL1, EL2 is shortened, electrodes EL1, EL2 are covered with respective shields 5, 6 except for the contacts of electrodes EL1, EL2. Further, an insulator 7 is applied to respective portions of shields 5, 6, namely the portions facing each other. Electrode EL1 is formed in a tubular shape.

Referring back to FIG. 1, vacuum circuit breaker 4 is controlled by control signal φ4 from controller 30. Normally, vacuum circuit breaker 4 is caused to be in closed state (conducting state) to pass a direct current. For interruption of the direct current, vacuum circuit breaker 4 is caused to be in opened state (non-conducting state) to commutate the direct current to semiconductor switch 20.

Vacuum circuit breaker 4 includes a vacuum vessel called vacuum bulb, two electrodes provided in the vacuum vessel, and a driver causing the two electrodes to be connected to conduct the current or causing the two electrodes to be disconnected to interrupt the current. The driver drives the electrodes using a high speed spring, a hydraulic pressure, an electromagnetic force, or the like.

In vacuum circuit breaker 4, an arc is generated when contacts of the two electrodes are disconnected from each other while the current is conducted. When the distance between the contacts becomes equal to or more than a certain distance, the current can be interrupted by forcing the current to reach the zero value. The insulation capability of vacuum circuit breaker 4 may be inferior to the insulation capability of gas disconnector 3. As the insulation capability between the two electrodes, a capability to withstand a voltage generated between the electrodes while a fault current is allowed to flow through semiconductor switch 20 in ON state may be enough. As the insulation capability between the electrodes and ground, a capability to withstand a voltage of the DC power transmission system may be enough.

For interruption of a direct current, forced commutating circuit 10 forces a current to flow to vacuum circuit breaker 4 in the opposite direction to the direction of the direct current flowing through vacuum circuit breaker 4, to thereby generate a zero current point in vacuum circuit breaker 4 and thus cause vacuum circuit breaker 4 to be in non-conducting state. Commutation forcing circuit 10 includes a capacitor 11, a reactor 12, switches 13 to 15, and a charger 16. Capacitor 11, reactor 12, and switch 13 are connected in series between an upstream electrode and a downstream electrode of vacuum circuit breaker 4.

Capacitor 11 and reactor 12 constitute a resonant circuit. Reactor 12 may be replaced with an inductance component of the electrical path of the circuit in some cases. As switch 13, a switch such as vacuum circuit breaker or gas circuit breaker may be used, a gas or vacuum gap switch may be used, or a semiconductor element such as thyristor or IGBT (Insulated Gate Bipolar Transistor) may be used.

Switch 13 is controlled by control signal ϕ13 from controller 30. Normally, switch 13 is controlled to be nonconductive. For interruption of a direct current, switch 13 is controlled to be in conducting state. When switch 13 is caused to be in conducting state, a current in the opposite direction to the direction of the direct current is caused to flow from capacitor 11 to vacuum circuit breaker 4 through the reactor and switch 13 to thereby force the direct current flowing in vacuum circuit breaker 4 to reach zero. In this way, vacuum circuit breaker 4 is caused to be nonconductive.

The negative terminal of charger 16 is connected through switch 14 to the negative electrode of capacitor 11, and the positive terminal of charger 16 is connected through switch 15 to the positive electrode of capacitor 11. Switches 14, 15 and charger 16 are controlled for example by controller 30. For charging, switches 14, 15 are controlled to be in conducting state, and charger 16 is controlled to charge capacitor 11 to a predetermined DC voltage through switches 14, 15.

Between upstream electrical path 1a and downstream electrical path 1b, semiconductor switch 20 is connected in parallel with mechanical switch 2. Semiconductor switch 20 is controlled by control signal ϕ20 from controller 30. For interruption of a direct current, semiconductor switch 20 is caused to be in non-conducting state after allowing flow of the current commutated from mechanical switch 2. Semiconductor switch 20 includes for example a semiconductor element such as IGBT or GTO formed of a semiconductor such as SiC for example, and a driver which causes the semiconductor element to be conductive or nonconductive in response to control signal ϕ20, and configured in the form of a module. Semiconductor switch 20 may include a plurality of parallel or series-connected semiconductor elements. FIG. 1 shows semiconductor switch 20 including one IGBT 21.

Figure 3:
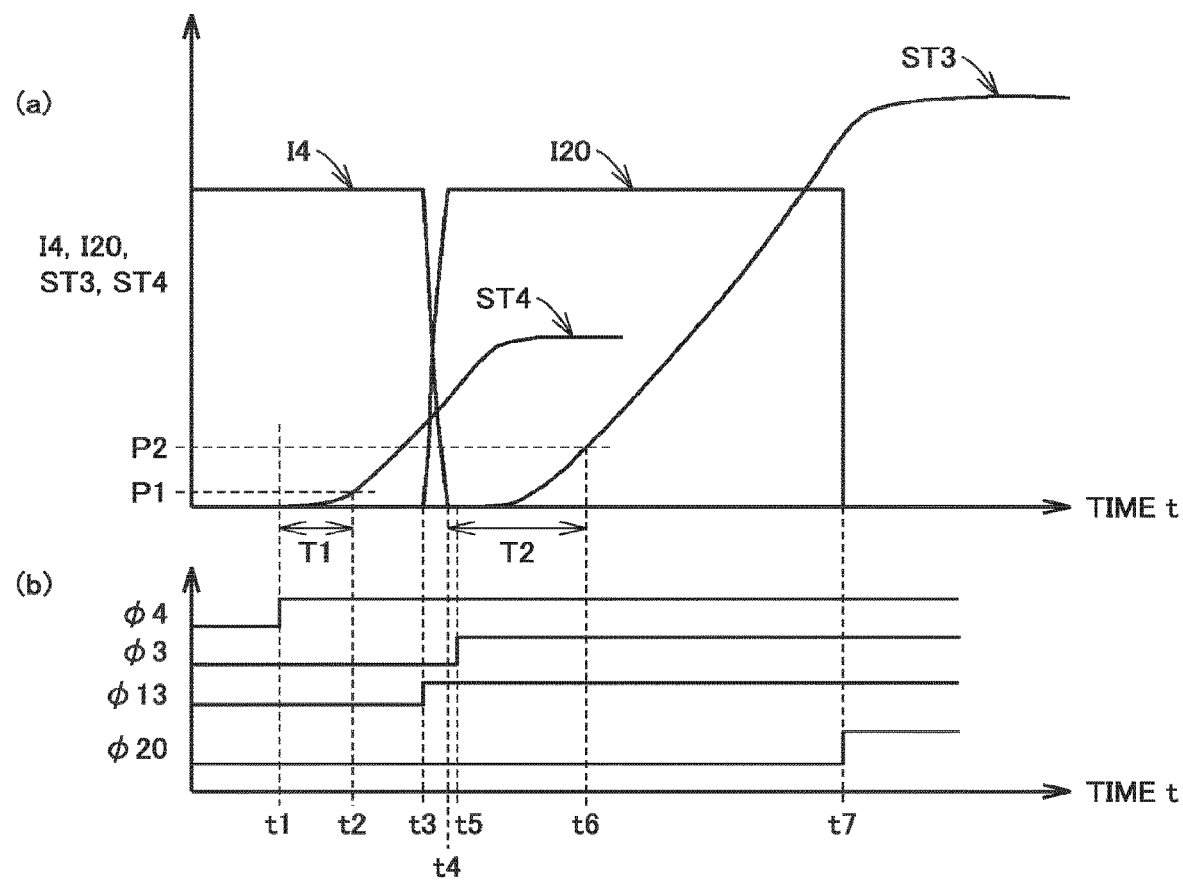
FIG. 3 is a time chart showing an operation of the DC circuit breaker shown in FIG. 1.

FIG. 3 (a), (b) is a time chart showing an operation of the current circuit breaker. FIG. 3 (a) shows respective changes with time of current I4 flowing through vacuum circuit breaker 4, current I20 flowing through semiconductor switch 20, stroke ST4 of the driver included in vacuum circuit breaker 4, and stroke ST3 of the driver included in gas disconnector 3. FIG. 3 (b) shows respective changes with time of control signals ϕ3, ϕ4, ϕ13, and ϕ20 for gas disconnector 3, vacuum circuit breaker 4, semiconductor switch 20, and switch 13, respectively.

FIG. 3 (a), (b) shows that for normal conduction (initial state), all of control signals ϕ3, ϕ4, ϕ13, and ϕ20 are set to "L" level to cause gas disconnector 3, vacuum circuit breaker 4, and semiconductor switch 20 to be in conducting state, and cause switch 13 to be in non-conducting state. It is supposed that charging of capacitor 11 has been completed and switches 14, 15 are in non-conducting state.

In this condition, a direct current flows through mechanical switch 2 (namely gas disconnector 3 and vacuum circuit breaker 4) while the direct current does not flow through semiconductor switch 20 because a voltage across the terminals of mechanical switch 2 is lower than an ON voltage of semiconductor switch 20. It should be noted, when the voltage across the terminals of mechanical switch 2 exceeds the ON voltage of semiconductor switch 20, the direct current flows through semiconductor switch 20.

When a fault occurs in the DC power transmission system, an open command for causing the DC circuit breaker to be in non-conducting state to interrupt the direct current is given from an external protection relay to controller 30. Initially, at time t1, controller 30 raises control signal ϕ4 from "L" level to "H" level to cause the driver of vacuum circuit breaker 4 to start opening operation. Semiconductor switch 20 may normally be in non-conducting state, and semiconductor switch 20 may be caused to be in conducting state at this time (time t1).

At time t2, stroke ST4 of the driver in vacuum circuit breaker 4 reaches contacts-open position P1. Then, the contacts of the two electrodes are disconnected from each other and a vacuum arc is generated between the contacts. Since the vacuum arc voltage is on the order of a few volts or less, simple disconnection of the contacts may not be able to cause the vacuum arc voltage to exceed the ON voltage of semiconductor switch 20 and the current may not be commutated from vacuum circuit breaker 4 to semiconductor switch 20 in some cases.

Next, at time t3, controller 30 raises control signal ϕ13 from "L" level to "H" level to make switch 13 conductive. Accordingly a current in the opposite direction to the direction of the direct current flows from capacitor 11 through reactor 12 and switch 13 to vacuum circuit breaker 4 to generate a zero current point and thereby extinguish the vacuum arc and cause vacuum circuit breaker 4 to be in non-conducting state. Accordingly, the voltage across the terminals of vacuum circuit breaker 4 exceeds the ON voltage of semiconductor switch 20 and the direct current is commutated from vacuum circuit breaker 4 to semiconductor switch 20 (time t4).

Namely, when the inter-contact distance which is the distance between the contacts of vacuum circuit breaker 4 reaches a distance that enables current interruption (time t3), control signal ϕ13 is set to "H" level to cause switch 13 of forced commutating circuit 10 to be conductive. Capacitor 11 is charged by charger 16 in advance to a voltage value and a polarity that allows flow of a current in the opposite direction to the direction of the fault direct current flowing through vacuum circuit breaker 4. Therefore, when switch 13 is caused to be in conducting state, discharging of capacitor 11 is started and the inverse current is applied to vacuum circuit breaker 4.

In vacuum circuit breaker 4, superimposition of the fault direct current and the inverse current generates a zero current point. At the zero current point, vacuum circuit breaker 4 interrupts the current flowing into vacuum circuit breaker 4. Accordingly, the fault direct current is commutated from vacuum circuit breaker 4 to semiconductor switch 20. In order for interruption of the fault direct current to be successful, the withstand voltage between the contacts of vacuum circuit breaker 4 may be at least a voltage on the order of a voltage higher than the ON voltage of semiconductor switch 20.

When the fault direct current is commutated to semiconductor switch 20 and accordingly no current flows through gas disconnector 3, controller 30 raises at time t5 control signal ϕ3 from "L" level to "H" level to cause the driver of gas disconnector 3 to start opening operation. At time t6, stroke ST3 of the driver of gas disconnector 3 reaches contacts-open position P2.

When the inter-contact distance of gas disconnector 3 reaches a distance that is enough for gas disconnector 3 to withstand a voltage which is applied from the system to the DC circuit breaker upon interruption of the fault current by opening of semiconductor switch 20 (time t7), controller 30 raises control signal ϕ20 from "L" level to "H" level to cause semiconductor switch 20 to be in non-conducting state. At this time, almost the entire voltage applied to the DC circuit breaker is applied to gas disconnector 3. Therefore, the voltage withstanding capability of vacuum circuit breaker 4 may be lower than the voltage withstanding capability of gas disconnector 3. As long as semiconductor switch 20 is configured to have a capability to withstand the voltage applied from the DC power transmission system, interruption of the direct current is completed.

Thus, in the first embodiment, normally the direct current is allowed to flow through mechanical switch 2 (namely gas disconnector 3 and vacuum circuit breaker 4) and the power loss can therefore be reduced. Moreover, vacuum circuit breaker 4 having a relatively low voltage withstanding capability may be used and the price of the DC circuit breaker can therefore be reduced.

Moreover, since the opening operation of gas disconnector 3 is started after current I4 flowing in vacuum circuit breaker 4 becomes zero, no arc is generated between the contacts of gas disconnector 3. The arc is an extremely-high-temperature plasma which reaches 20000 K. Therefore, if a large current arc is maintained for a long time, the contacts are worn to be damaged. In addition, because the gas or air serving as an insulating medium reaches a high temperature, the insulation capability is deteriorated immediately after the arc is extinguished, relative to the case where the contacts are opened without arcing. However, when the opening operation as described above is performed, no arc is generated in gas disconnector 3, and therefore, there is no wear or damage of the contacts or no deterioration of the insulation capability. Accordingly, even with a short gap length, a sufficient insulation distance can be obtained. Thus, not only reduction of the size of the DC circuit breaker but also reduction of the time taken for opening the contacts can be achieved and the opening operation can thus be made faster.

Moreover, the above-described configuration enables a fast and low-cost DC circuit breaker to be obtained. Specifically, a DC circuit breaker which is applicable even to a DC power transmission system of an extra high voltage of 300 kV or more for example and which is capable of interrupting even a fault current of 10 kA or more for example can be obtained.

In the first embodiment, a disconnector in which a gas insulating medium such as $SF_6$ gas is used is employed as gas disconnector 3. However, a vacuum disconnector having its contacts in a vacuum vessel may also be used instead of gas disconnector 3 as long as the vacuum disconnector has a sufficient inter-contact distance that is enough for the vacuum disconnector to withstand a voltage applied to the DC circuit breaker.

Moreover, instead of vacuum circuit breaker 4, a gas circuit breaker in which an insulating arc-extinguishing medium such as $SF_6$ gas, nitrogen, argon, air, carbon dioxide, or the like is used may be employed, or a circuit breaker in which a magnetic field of a permanent magnet or electromagnet drives an arc and with this magnetic drive the arc is extinguished may be employed.

Second Embodiment

In the first embodiment, vacuum circuit breaker 4 is made nonconductive to allow the direct current to be commutated to semiconductor switch 20, gas disconnector 3 is then made nonconductive, and thereafter semiconductor switch 20 is made nonconductive. In this way, the DC circuit breaker is made nonconductive.

Namely, as shown in FIG. 3, vacuum circuit breaker 4 is caused to start the opening operation (time t1), the two contacts of vacuum circuit breaker 4 are then disconnected from each other (time t2), accordingly gas disconnector 3 is caused to start the opening operation (time t5), the two contacts of gas disconnector 3 are then disconnected from each other (time t6), and accordingly semiconductor switch 20 is made nonconductive (time t7). In this way, the DC circuit breaker is made nonconductive.

However, time T1 (time t1 to t2) from the start of the opening operation of vacuum circuit breaker 4 to the disconnection of its two contacts differs from time T2 (time t5 to t6) from the start of the opening operation of gas disconnector 3 to the disconnection of its two contacts. FIG. 3 shows that time T1 and T2 meet T1<T2.

Figure 4:
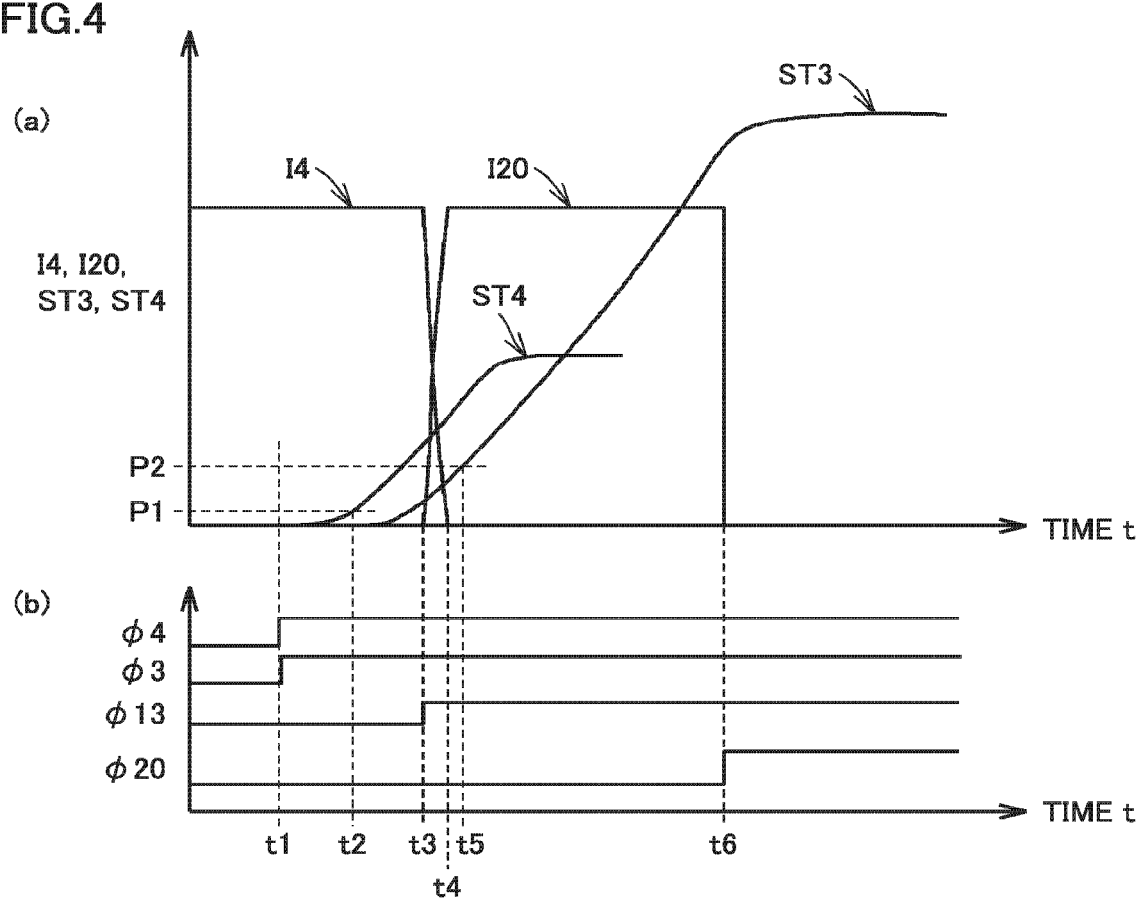
FIG. 4 is a time chart showing an operation of a DC circuit breaker in a second embodiment of the present invention.

Then, in the second embodiment, when the condition T1<T2 is met, control signals ϕ4 and ϕ3 are raised simultaneously to "H" level as shown in FIGS. 4 (a) and (b) to cause vacuum circuit breaker 4 and gas disconnector 3 to simultaneously start respective opening operations (time t1). Even in this case, the two contacts of vacuum circuit breaker 4 can be disconnected from each other and thereafter the two contacts of gas disconnector 3 can be disconnected from each other, from which the same effects as those of the first embodiment are obtained. Moreover, the time taken for interrupting a fault current can be shortened by the time by which the opening operation of gas disconnector 3 is made earlier.

In the second embodiment, control signals ϕ4 and ϕ3 are raised simultaneously to "H" level to cause vacuum circuit breaker 4 and gas disconnector 3 to simultaneously start respective opening operations. However, the opening operations may not necessarily be started exactly simultaneously. Within a range of an error due to the performance of controller 30 or the like, there may be some difference in time between the start of one opening operation and the start of the other opening operation.

In the second embodiment, vacuum circuit breaker 4 and gas disconnector 3 are caused to start respective opening operations simultaneously. However, if it is possible to disconnect the two contacts of vacuum circuit breaker 4 and thereafter disconnect the two contacts of gas disconnector 3, gas disconnector 3 may be caused to start its opening operation and thereafter vacuum circuit breaker 4 may be caused to start its opening operation, or vacuum circuit breaker 4 may be caused to start its opening operation and thereafter gas disconnector 3 may be caused to start is opening operation.

Third Embodiment

Figure 5:
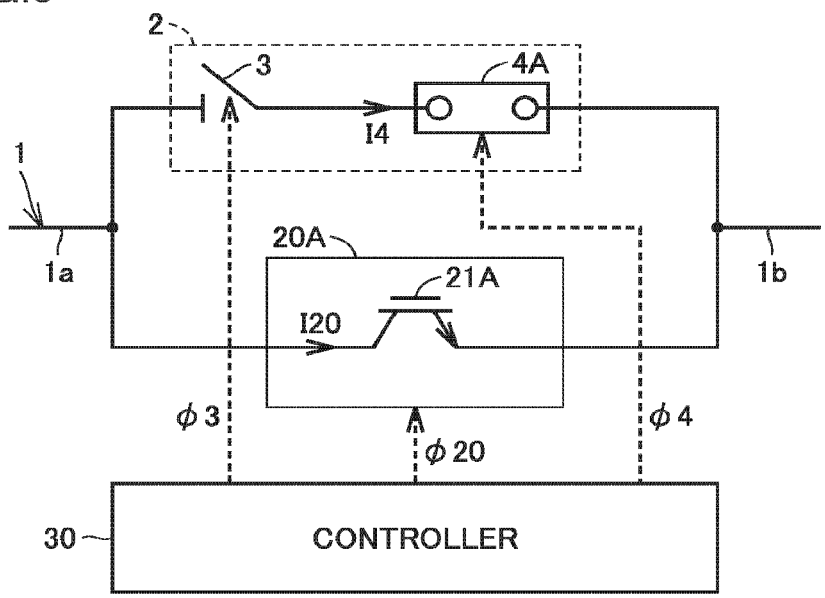
FIG. 5 is a circuit block diagram showing a configuration of a DC circuit breaker in a third embodiment of the present invention.

FIG. 5 is a circuit block diagram showing a configuration of a DC circuit breaker in a third embodiment of the present invention, which is to be contrasted with FIG. 1. Referring to FIG. 5, this DC circuit breaker differs from the DC circuit breaker in FIG. 1 in that vacuum circuit breaker 4 is replaced with a gas circuit breaker 4A, semiconductor switch 20 is replaced with a semiconductor switch 20A, and forced commutating circuit 10 is eliminated. In gas circuit breaker 4A, an insulating arc-extinguishing medium such as $SF_6$ gas, nitrogen, argon, air, carbon dioxide, or the like fills the space between electrodes.

When gas circuit breaker 4A is caused to perform the opening operation, an arc is generated between its contacts and a higher arc voltage than vacuum circuit breaker 4 is obtained. Semiconductor switch 20A includes an IGBT 21A formed of SiC. IGBT 21A has a relatively low ON voltage. It is therefore possible to make the arc voltage of gas circuit breaker 4A sufficiently higher than the ON voltage of semiconductor switch 20A (namely the arc resistance of gas circuit breaker 4A can be made sufficiently higher than the ON resistance (the resistance value when the switch is turned on)). Then, without generating a zero current point in gas circuit breaker 4A, the direct current can be commutated to semiconductor switch 20A. Commutation forcing circuit 10 is therefore unnecessary and the price of the DC circuit breaker can be reduced.

Fourth Embodiment

Figure 6:
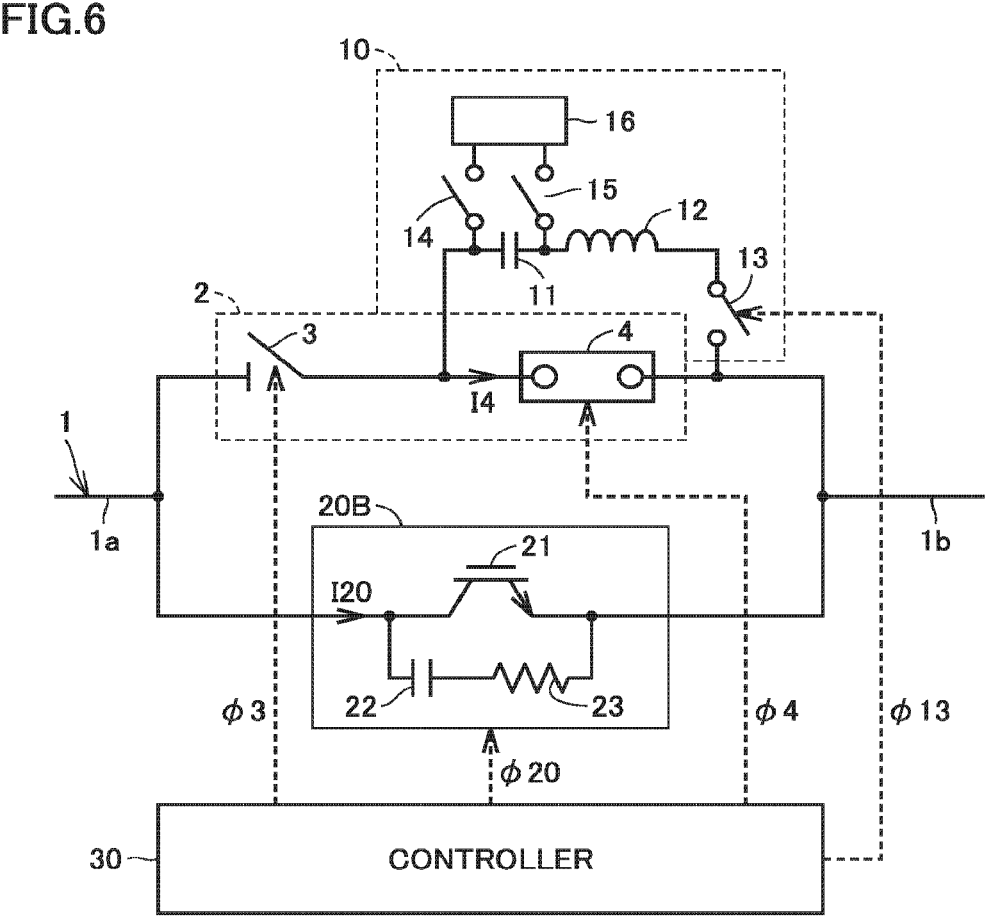
FIG. 6 is a circuit block diagram showing a configuration of a DC circuit breaker in a fourth embodiment of the present invention.

FIG. 6 is a circuit block diagram showing a configuration of a DC circuit breaker in a fourth embodiment of the present invention, which is to be contrasted with FIG. 1. Referring to FIG. 6, this DC circuit breaker differs from the DC circuit breaker in FIG. 1 in that semiconductor switch 20 is replaced with a semiconductor switch 20B.

Semiconductor switch 20B additionally includes a capacitor 22 and a resistance element 23 relative to semiconductor switch 20. Capacitor 22 and resistance element 23 are connected in series between the collector and the emitter of IGBT 21 to form a snubber circuit for absorbing a surge voltage. In this fourth embodiment as well, the same effects as those of the first embodiment are obtained.

Figure 7:
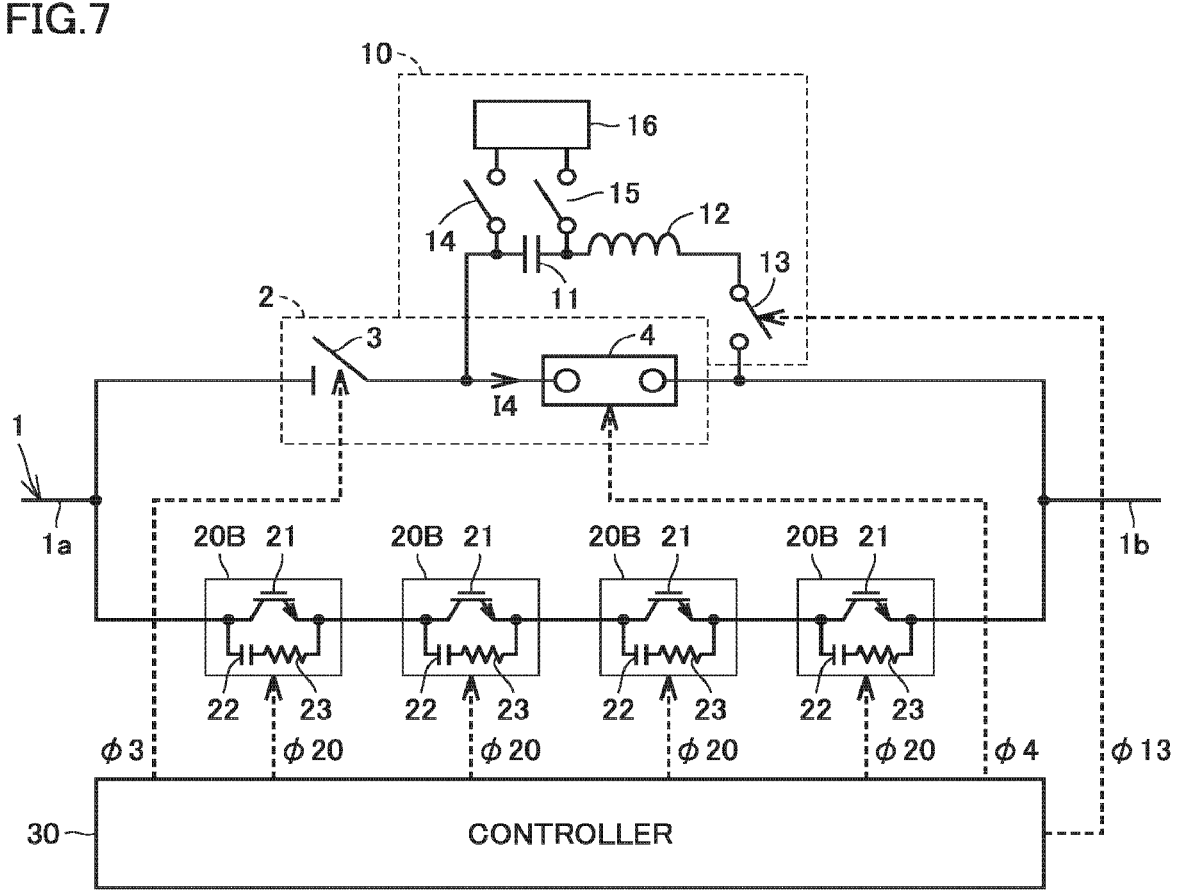
FIG. 7 is a circuit block diagram showing a modification of the fourth embodiment.

As shown in FIG. 7, a plurality of (four in FIG. 7) semiconductor switches 20B may be connected in series between upstream electrical path 1a and downstream electrical path 1b.

Fifth Embodiment

Figure 8:
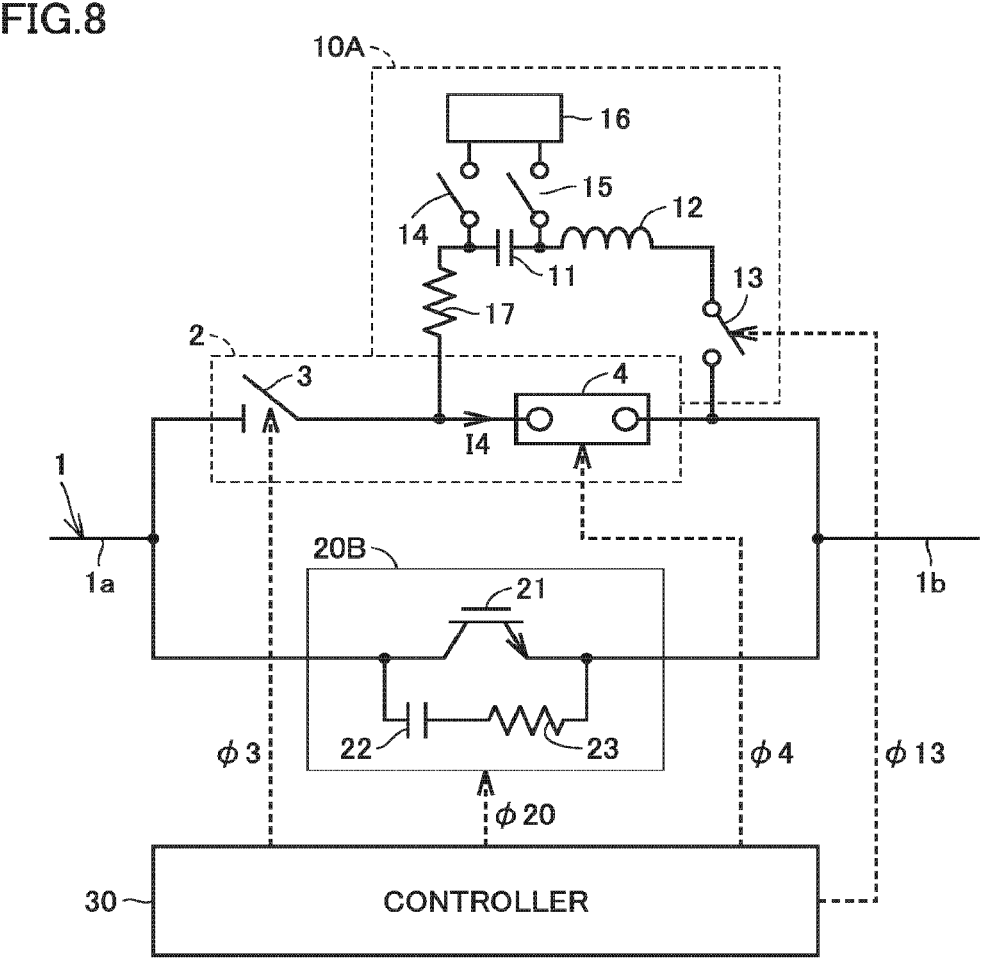
FIG. 8 is a circuit block diagram showing a configuration of a DC circuit breaker in a fifth embodiment of the present invention.

FIG. 8 is a circuit block diagram showing a configuration of a DC circuit breaker in a fifth embodiment of the present invention, which is to be contrasted with FIG. 6. Referring to FIG. 8, this DC circuit breaker differs from the DC circuit breaker in FIG. 6 in that forced commutating circuit 10 is replaced with a forced commutating circuit 10A.

Commutation forcing circuit 10A additionally includes a resistance element 17 relative to forced commutating circuit 10. Between the gas disconnector 3 side electrode of vacuum circuit breaker 4 and the downstream electrical path 1b side electrode of vacuum circuit breaker 4, resistance element 17, capacitor 11, reactor 12, and switch 13 are connected in series.

In the fifth embodiment, when vacuum circuit breaker 4 is caused to be in non-conducting state, a reverse current applied from capacitor 11 to vacuum circuit breaker 4 through reactor 12 and switch 13 can be attenuated by resistance element 17.

Resistance element 17 may be replaced with reactor 12 or a resistance component of the electrical path in some cases.

Sixth Embodiment

Figure 9:
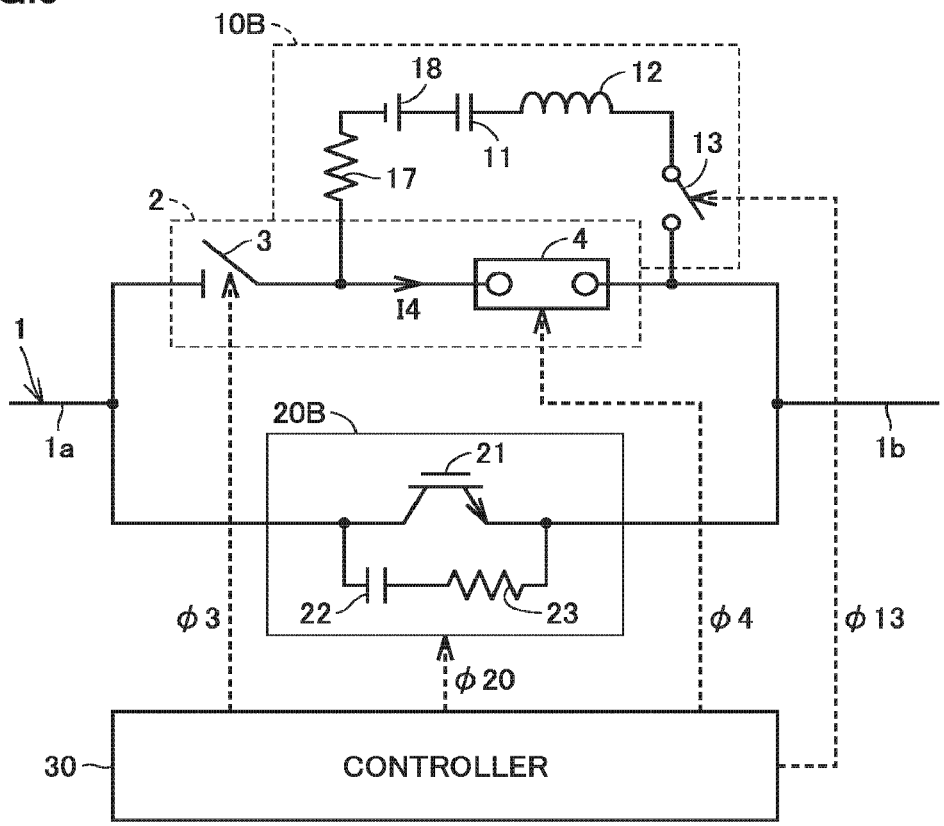
FIG. 9 is a circuit block diagram showing a configuration of a DC circuit breaker in a sixth embodiment of the present invention.

FIG. 9 is a circuit block diagram showing a configuration of a DC circuit breaker in a sixth embodiment of the present invention, which is to be contrasted with FIG. 8. Referring to FIG. 9, this DC circuit breaker differs from the DC circuit breaker in FIG. 8 in that forced commutating circuit 10A is replaced with a forced commutating circuit 10B.

Commutation forcing circuit 10B corresponds to forced commutating circuit 10A from which switches 14, 15 and charger 16 are removed and to which a battery 18 is added. The positive electrode of battery 18 is connected to the electrode, on the downstream electrical path 1b side, of vacuum circuit breaker 4, through capacitor 11, reactor 12, and switch 13, and the negative electrode of battery 18 is connected to the electrode, on the upstream electrical path 1a side, of vacuum circuit breaker 4 through resistance element 17. When vacuum circuit breaker 4 is caused to be in non-conducting state, switch 13 is caused to be in conducting state and a current in the opposite direction to the direction of the direct current is allowed to flow from battery 18 to vacuum circuit breaker 4 through capacitor 11, reactor 12, and switch 13.

In the sixth embodiment, switches 14, 15 and charger 16 are unnecessary, and the size of the DC circuit breaker can therefore be reduced.

Seventh Embodiment

Figure 10:
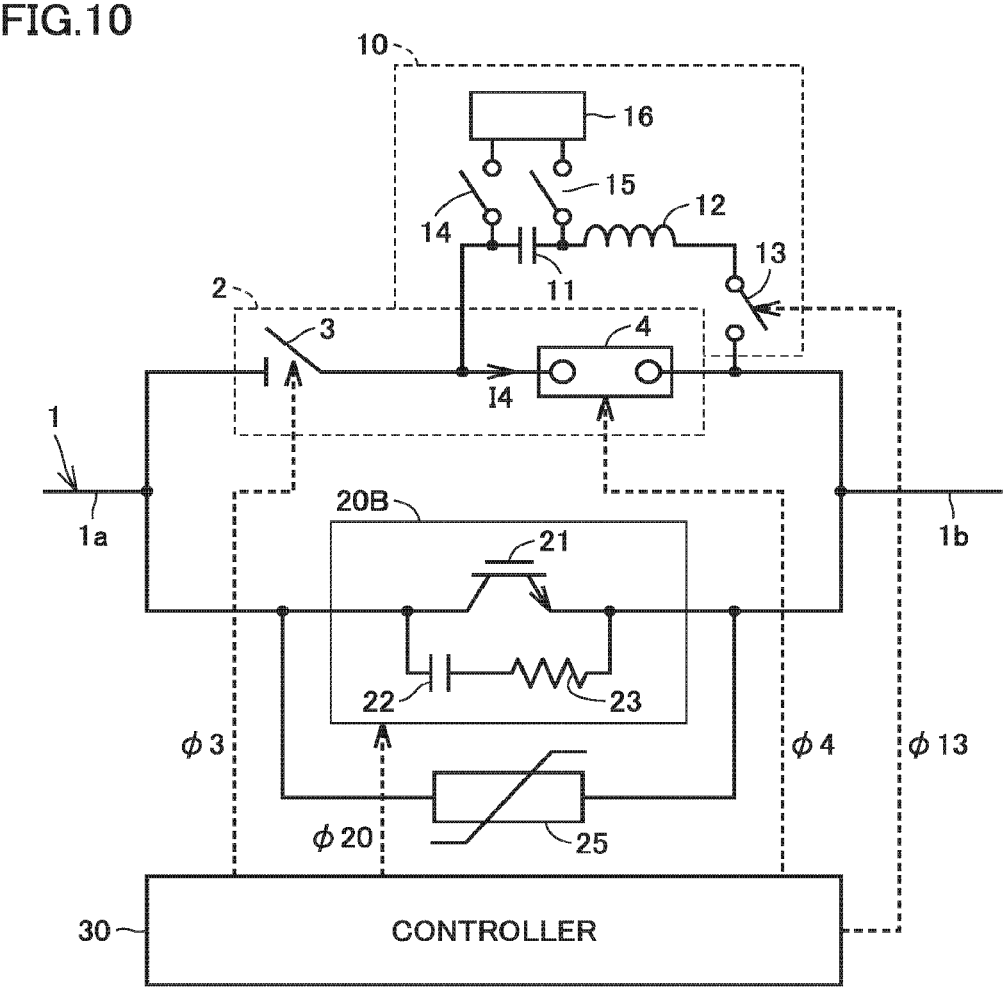
FIG. 10 is a circuit block diagram showing a configuration of a DC circuit breaker in a seventh embodiment of the present invention.

FIG. 10 is a circuit block diagram showing a configuration of a DC circuit breaker in a seventh embodiment of the present invention, which is to be contrasted with FIG. 6. Referring to FIG. 10, this DC circuit breaker differs from the DC circuit breaker in FIG. 6 in that the former additionally includes a lighting arrester 25. Lighting arrester 25 is connected in parallel with semiconductor switch 20B and absorbs circuit energy after semiconductor switch 20B is made nonconductive to interrupt the direct current.

Namely, when semiconductor switch 20B is made nonconductive, the direct current is commutated from semiconductor switch 20B to lighting arrester 25. In lighting arrester 25, a voltage is generated between terminals depending on the speed of response to a transient change of current during the commutation. When the voltage between the terminals is higher than the system voltage, the direct current is successfully commutated to lighting arrester 25 if each of gas disconnector 3 and semiconductor switch 20B has a voltage withstanding capability to withstand the voltage generated between the terminals of lighting arrester 25. The current flowing through lighting arrester 25 is attenuated in accordance with a time constant which is determined by the reactors of lighting arrester 25 and the electrical path. When the current becomes substantially zero, interruption of the direct current is completed.

In the seventh embodiment, the circuit energy can speedily be attenuated after semiconductor switch 20B is made nonconductive.

Eighth Embodiment

Figure 11:
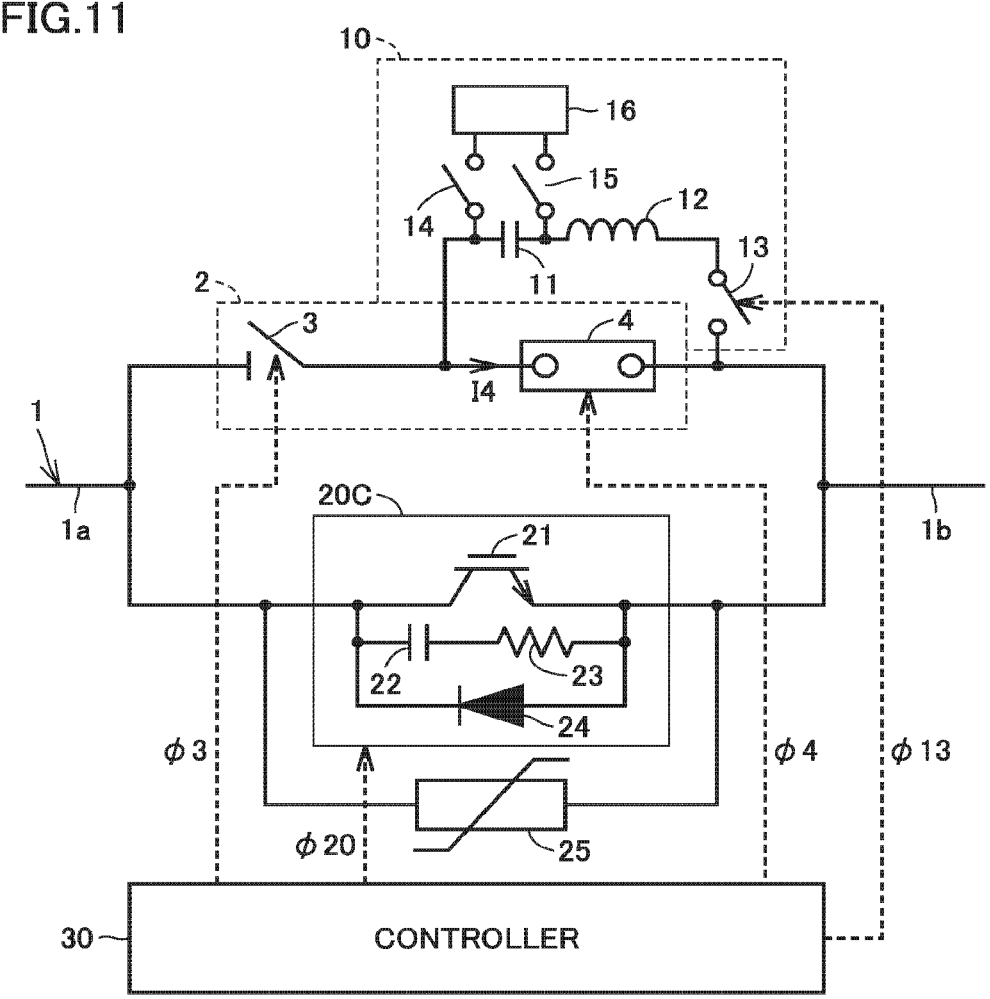
FIG. 11 is a circuit block diagram showing a configuration of a DC circuit breaker in an eighth embodiment of the present invention.

FIG. 11 is a circuit block diagram showing a configuration of a DC circuit breaker in an eighth embodiment of the present invention, which is to be contrasted with FIG. 10. Referring to FIG. 11, this DC circuit breaker differs from the DC circuit breaker in FIG. 10 in that semiconductor switch 20B is replaced with a semiconductor switch 20C.

Semiconductor switch 20C additionally includes a diode 24 relative to semiconductor switch 20B. Diode 24 is connected in antiparallel with IGBT 21. Namely, the anode and the cathode of diode 24 are connected respectively to the emitter and the collector of IGBT 21.

When a reverse current is allowed to flow from capacitor 11 to vacuum circuit breaker 4 through reactor 12 and switch 13, the current flows through a path from the positive electrode of capacitor 11 to the negative electrode of capacitor 11 through reactor 12, switch 13, diode 24, and gas disconnector 3. Therefore, a remaining voltage of capacitor 11 is not applied to IGBT 21. The stress on IGBT 21 is thus reduced.

The current flowing from capacitor 11 to diode 24 is the remaining current. The remaining current can be attenuated to be extinguished by resistance element 17 in FIG. 8 for example. After the remaining current is extinguished, gas disconnector 3 may be opened. Then, no arc is generated in gas disconnector 3. Similar effects to those of the first embodiment are thus obtained.

Moreover, gas disconnector 3 may be designed so that an arc can be extinguished even when a small current like the remaining current flows. In this case, the opening operation can be started without waiting for extinguishing of the arc. Thus, the time to completion of interruption can be shortened, and a fast DC circuit breaker can be obtained. Further, gas disconnector 3 can reliably be interrupted by providing means for assisting arc extinguishing. Specifically, in order to interrupt a small current, a permanent magnet or electromagnet may be used to generate a magnetic force which drives an arc and thereby assists arc extinguishing.

Ninth Embodiment

Figure 12:
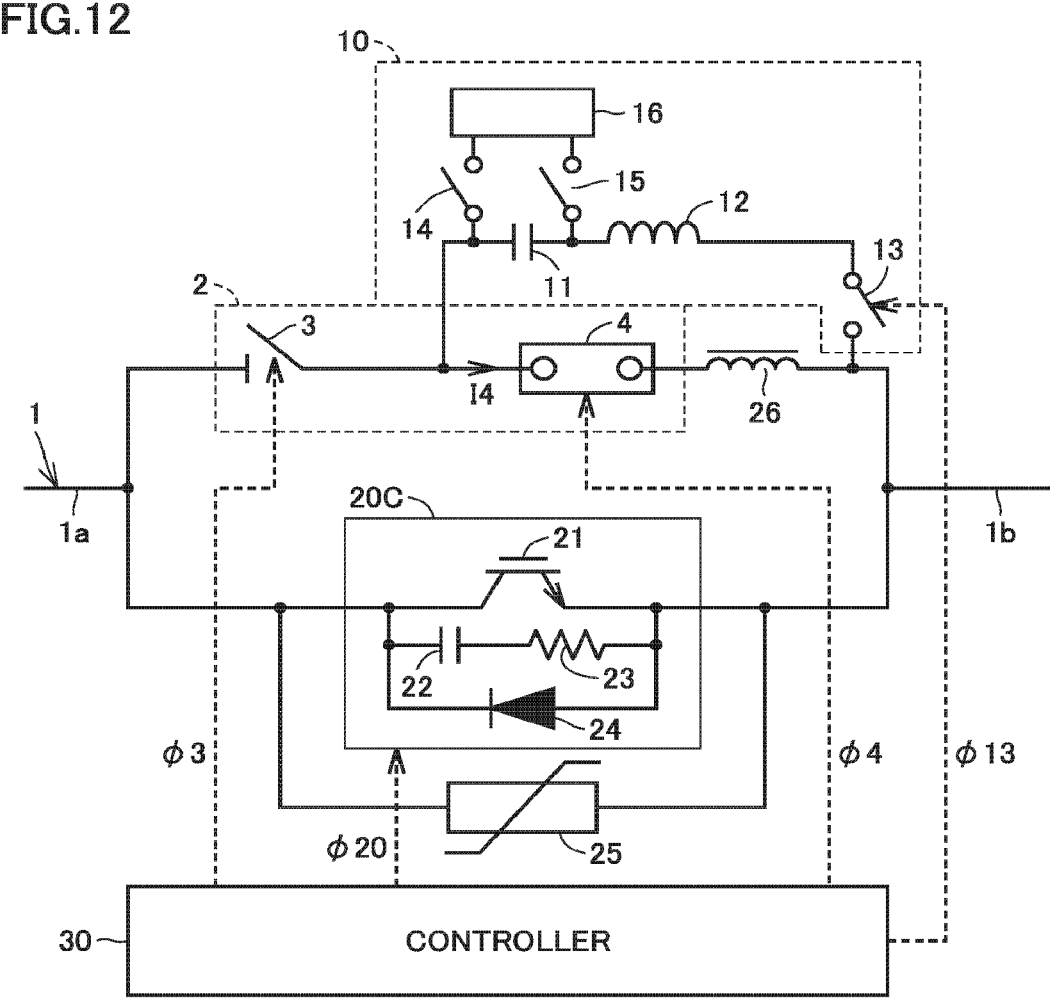
FIG. 12 is a circuit block diagram showing a configuration of a DC circuit breaker in a ninth embodiment of the present invention.

FIG. 12 is a circuit block diagram showing a configuration of a DC circuit breaker in a ninth embodiment of the present invention, which is to be contrasted with FIG. 11. Referring to FIG. 12, this DC circuit breaker differs from the DC circuit breaker in FIG. 11 in that the former additionally includes a saturable reactor 26. Saturable reactor 26 is connected between the electrode, on the downstream electrical path 1b side, of vacuum circuit breaker 4, and the terminal, on the downstream electrical path 1b side, of switch 13.

Saturable reactor 26 has its inductance non-linearly changed with respect to the current value, and has a feature that the inductance decreases as the current value increases while the inductance increases as the current value decreases. Since saturable reactor 26 is provided, the change of the current with time is reduced when the reverse current is supplied from capacitor 11 to vacuum circuit breaker 4 through reactor 12 and switch 13 to thereby cause the current flowing in vacuum circuit breaker 4 to be substantially 0 A. Accordingly, interruption of vacuum circuit breaker 4 is facilitated and commutation of the direct current from vacuum circuit breaker 4 to semiconductor switch 20 is ensured.

It should be noted that the above-described first to ninth embodiments may of course be combined appropriately.

It should be construed that the embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST 1 electrical path; 1a upstream electrical path; 1b downstream electrical path; 3 gas disconnector; 4 vacuum circuit breaker; 4A gas circuit breaker; EL1, EL2 electrode; 5, 6 shield; 7 insulator; 10, 10A, 10B forced commutating circuit; 11, 22 capacitor; 12 reactor; 13-15 switch; 16 charger; 17, 23 resistance element; 18 battery; 20, 20A-20C semiconductor switch; 21, 21A IGBT; 24 diode; 25 lighting arrester; 26 saturable reactor; 30 controller

The invention claimed is:
1. A DC circuit breaker comprising:
a mechanical switch provided in an electrical path through which a direct current flows;
a semiconductor switch connected in parallel with the mechanical switch; and
a forced commutating circuit configured to force a current in an opposite direction to a direction of the direct current to flow to a vacuum circuit breaker when interrupting the direct current,
the mechanical switch including a disconnector and the vacuum circuit breaker connected in series, wherein
normally, the direct current flows through the mechanical switch,
when interrupting the flow of the direct current, the vacuum circuit breaker is made nonconductive to allow the direct current to be commutated to the semiconductor switch, then subsequently contacts of the disconnector are disconnected from each other, and then subsequently the semiconductor switch is made nonconductive, wherein
contacts of the vacuum circuit breaker are disconnected from each other and subsequently the contacts of the disconnector are disconnected from each other,
an inter-electrode withstand voltage of the vacuum circuit breaker is higher than an inter-electrode voltage of the semiconductor switch in conducting state, is not higher than an inter-electrode voltage of the semiconductor switch in non-conducting state, and is lower than an inter-electrode withstand voltage of the disconnector,
the forced commutating circuit includes:
a battery;
a resonance circuit including a capacitor and a reactor which are connected in series with the battery; and
a switch configured to connect, in an interrupting operation for interrupting the vacuum circuit breaker, the battery and the resonance circuit to the vacuum circuit breaker to allow the current in the opposite direction to the direction of the direct current to flow from the battery to the vacuum circuit breaker through the capacitor and the reactor.
2. The DC circuit breaker according to claim 1, wherein an opening operation of the vacuum circuit breaker is started and subsequently an opening operation of the disconnector is started.
3. The DC circuit breaker according to claim 1, wherein an opening operation of the vacuum circuit breaker and an opening operation of the disconnector are started simultaneously.
4. The DC circuit breaker according to claim 1, wherein the forced commutating circuit further includes a resistance element configured to attenuate the current in the opposite direction to the direction of the direct current after the vacuum circuit breaker is made nonconductive.
5. The DC circuit breaker according to claim 1, further comprising a saturable reactor provided in the electrical path and connected in series with the vacuum circuit breaker, wherein
the forced commutating circuit is configured to force the current in the opposite direction to the direction of the direct current to flow to the vacuum circuit breaker through the saturable reactor when interrupting the direct current.

6. The DC circuit breaker according to claim 1, wherein the vacuum circuit breaker is made nonconductive and subsequently the current in the opposite direction to the direction of the direct current is interrupted by the disconnector.

7. The DC circuit breaker according to claim 1, wherein the semiconductor switch includes a transistor.

8. The DC circuit breaker according to claim 7, wherein the semiconductor switch includes a plurality of transistors connected in series.

9. The DC circuit breaker according to claim 7, wherein the semiconductor switch further includes a diode connected in antiparallel with the transistor.

10. The DC circuit breaker according to claim 1, further comprising a lighting arrester connected in parallel with the semiconductor switch and configured to absorb electrical energy after the semiconductor switch is made nonconductive.

11. A DC circuit breaker comprising:
a mechanical switch provided in an electrical path through which a direct current flows;
a semiconductor switch connected in parallel with the mechanical switch; and
a forced commutating circuit configured to force a current in an opposite direction to a direction of the direct current to flow to a vacuum circuit breaker when interrupting the direct current,
the mechanical switch including a disconnector and the vacuum circuit breaker connected in series, wherein normally, the direct current flows through the mechanical switch,
when interrupting the flow of the direct current, an opening operation of the vacuum circuit breaker and an opening operation of the disconnector are started simultaneously, the vacuum circuit breaker is made nonconductive to allow the direct current to be commutated to the semiconductor switch, and then subsequently the disconnector and the semiconductor switch are made nonconductive, wherein
contacts of the vacuum circuit breaker are disconnected from each other and then subsequently contacts of the disconnector are disconnected from each other,
an inter-electrode withstand voltage of the vacuum circuit breaker is higher than an inter-electrode voltage of the semiconductor switch in conducting state, is not higher than an inter-electrode voltage of the semiconductor switch in non-conducting state, and is lower than an inter-electrode withstand voltage of the disconnector,
the forced commutating circuit includes:
a battery;
a resonance circuit including a capacitor and a reactor which are connected in series with the battery; and
a switch configured to connect, in an interrupting operation for interrupting the vacuum circuit breaker, the battery and the resonance circuit to the vacuum circuit breaker to allow the current in the opposite direction to the direction of the direct current to flow from the battery to the vacuum circuit breaker through the capacitor and the reactor.

* * * * *